United States Patent [19]

Tokar et al.

[11] 4,243,397
[45] * Jan. 6, 1981

[54] AIR CLEANER WITH REPLACEABLE FILTER ELEMENT

[75] Inventors: Joseph C. Tokar, Apple Valley; Frank A. Janezich, Richfield, both of Minn.

[73] Assignee: Donaldson Company, Inc., Minneapolis, Minn.

[*] Notice: The portion of the term of this patent subsequent to Jul. 8, 1997, has been disclaimed.

[21] Appl. No.: 52,552

[22] Filed: Jun. 27, 1979

Related U.S. Application Data

[63] Continuation-in-part of Ser. No. 898,906, Apr. 24, 1978.

[51] Int. Cl.³ .............................................. B01D 50/00
[52] U.S. Cl. ......................................... 55/487; 55/492; 55/498
[58] Field of Search .................................. 55/485–489, 55/492, 497–500, 502, 503, 509; 210/457, 461, 484, 485, 487, 489, 493 R, 497 R

[56] References Cited

U.S. PATENT DOCUMENTS

| | | | |
|---|---|---|---|
| 4,073,632 | 2/1978 | Reinaver et al. | 55/498 |
| 4,135,899 | 1/1979 | Gaver | 55/497 |
| 4,171,963 | 10/1979 | Schuler | 55/498 |

*Primary Examiner*—David L. Lacey
*Attorney, Agent, or Firm*—Merchant, Gould, Smith, Edell, Welter & Schmidt

[57] ABSTRACT

An improved filter element assembly for use in an air cleaner on an internal combustion engine comprises a perforated liner. A replaceable filter element comprising a pleated filter medium is releasably coupled to the liner. A safety sleeve assembly is interposed between the filter medium and the liner. An outer liner surrounds the filter medium and exerts a radially inward force thereon to bias the pleats into engagement with the liner. The filter element assembly can be reconditioned when the filter medium becomes used with a replacement kit which includes a new filter element, safety sleeve assembly, and outer liner. The used filter element assembly is disassembled and the worn components thereof replaced with the new components of the kit. The filter medium is expandable from a collapsed cylindrical form in which the filter element is shipped to an expanded conical form for use during filtering operations.

4 Claims, 8 Drawing Figures

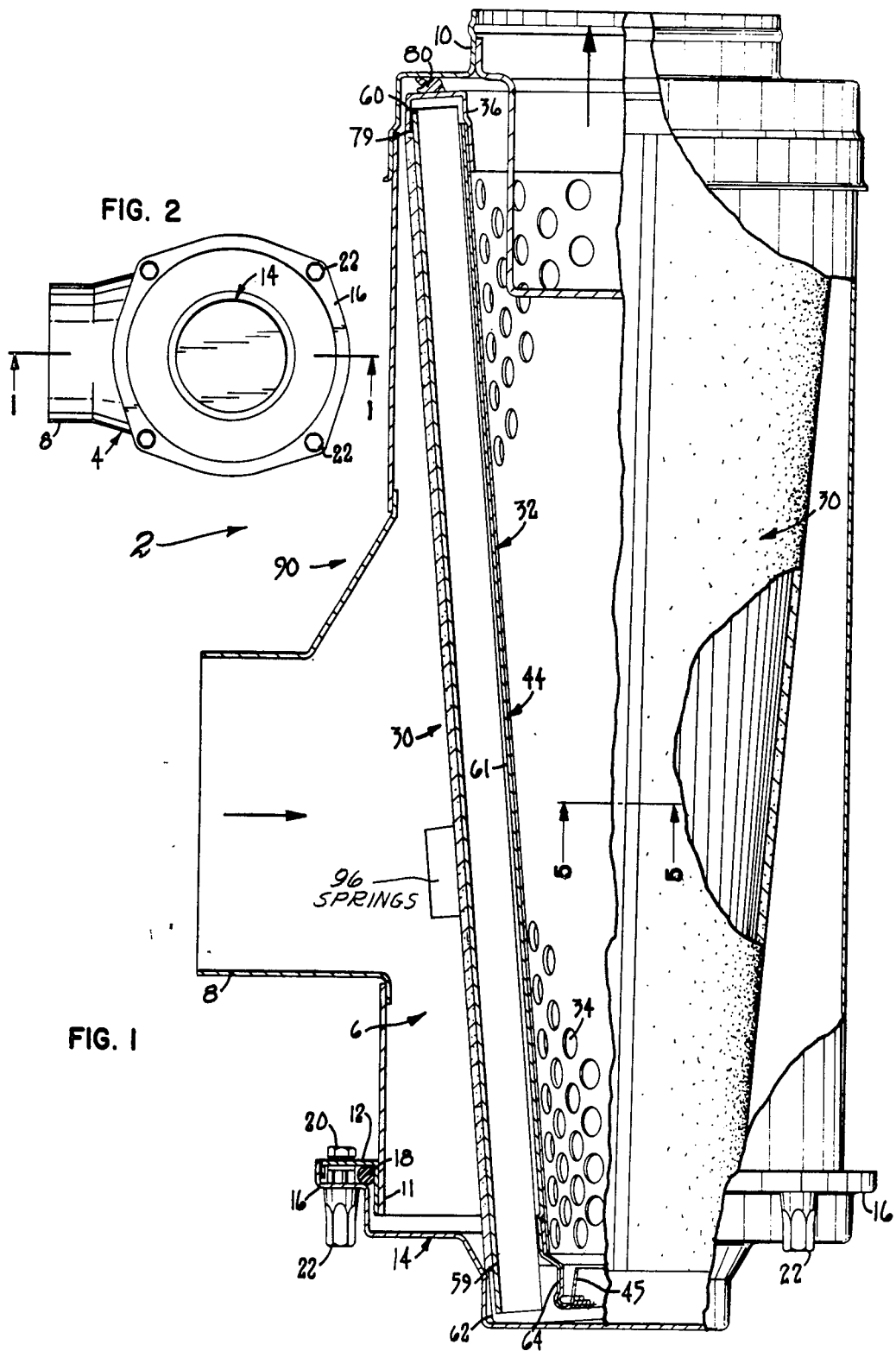

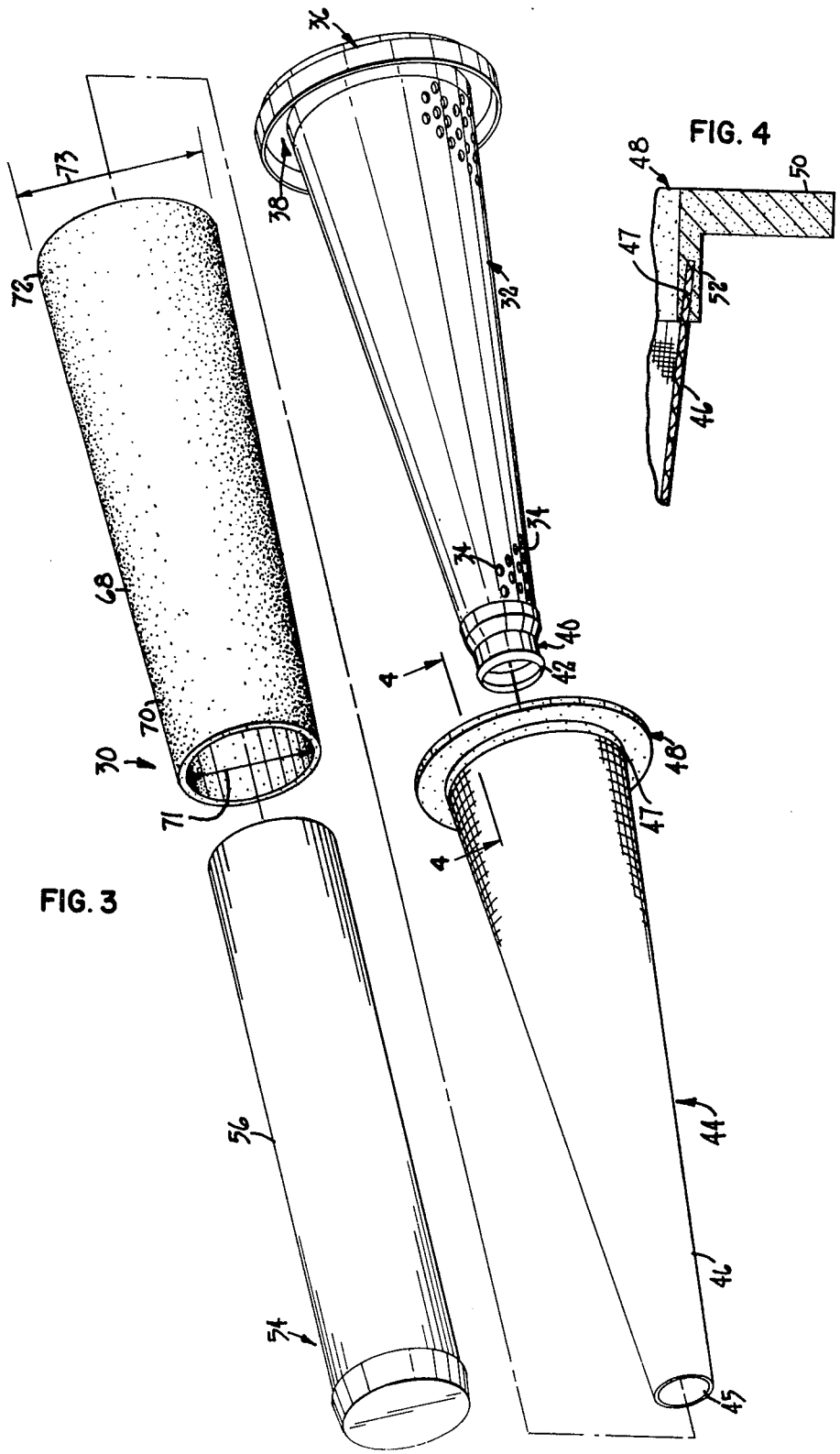

AIR CLEANER WITH REPLACEABLE FILTER ELEMENT

This application is a continuation-in-part application of U.S. patent application, Ser. No. 898,906, filed Apr. 24, 1978, entitled AIR FILTER WITH REPLACEABLE FILTER ELEMENT.

BACKGROUND OF THE INVENTION

1. Field of the Invention

This invention relates in general to devices for removing dust and other particulate contaminants from air or similar gases. More particularly, this invention relates to an air cleaner having a replaceable filter element assembly for use on internal combustion engines.

2. Description of the Prior Art

The internal combustion engine is a widely used power source which operates according to well-known principles. This type of engine is often used to power various movable vehicles, such as automobiles, trucks, snowmobiles, etc. In order for such an engine to operate properly, it is necessary to remove most of the dust, pollutants, or other particulate matter which is suspended in the air that is used as the intake air in the combustion process. Such particulate removal increases the efficiency at which the engine operates and prolongs the life of various engine components. Various types of air cleaners are used on internal combustion engines to filter the intake air.

More particularly, a special type of air cleaner is often used on the internal combustion engine of an over-the-road truck or the like. This air cleaner comprises a replaceable filter element assembly which is releasably contained inside a filter body. The filter element assembly includes two perforated spaced metal liners between which a pleated filter medium is contained. Two metal end caps integrally join the two liners and filter medium together to form a unitary filter element assembly. Whenever the pleated filter medium becomes too clogged for continued use in the filter body, it is necessary to replace the filter element assembly. This has been done in the past simply by discarding the entire filter element assembly, including the metal liners and end caps, and replacing it with an unused assembly.

The prior art structure of the filter element assembly and the prior practice of discarding the entire filter element assembly when the filter medium becomes plugged is wasteful. This is apparent since at least some of the components of the filter element assembly (e.g., the two metal liners) could be reused. Because they are not reused however, the cost of each of the filter element assemblies is increased by the need to provide two new metal liners in each one. This increases the maintenance costs for the vehicle on which such air cleaners are used. In addition, the air cleaners in commercial trucks are often replaced according to a schedule depending on the number of miles driven by the truck rather than the actual condition of the filter medium. This often means that such air cleaners are replaced before it is strictly necessary (i.e., when the filter medium has become plugged with filtered particles). Thus, the maintenance costs for vehicles using these air cleaners are further increased by the type of maintenance prevalent in the industry.

In addition, the previous filter element assemblies have been shipped from the factory in an assembled form with the filter medium being placed in the expanded form in which the medium is normally operable. Since the filter medium is often conically shaped, the fully assembled filter element assembly is usually quite large. As such these assemblies take up a great deal of space. This increases both the shipping costs and also the inventory cost of storing such filter element assemblies. In addition, because each new filter element assembly also includes two new metal liners, the weight of each assembly is also increased. This further causes an increase in shipping costs.

SUMMARY OF THE INVENTION

One aspect of this invention is to provide an improved filter element assembly for use in an air cleaner such that any permanent or non-replaceable portions of the filter element assembly are reused.

This invention comprises a filter element assembly which is to be rejuvenated or reconditioned as necessary whenever the filter medium therein becomes plugged beyond effective use. The filter element assembly of this invention comprises an inner metal liner having a U-shaped housing or end cup at one end and an annular locking rib at the other end. A safety sleeve assembly comprising a porous filter is to be slipped over the inner metal liner to substantially cover the entire length of the liner. The safety sleeve assembly has a gasket at one end which is received inside the end cup of the liner. A replaceable filter element is adapted to be releasably coupled to the metal liner. The filter element comprises a pleated filter medium having an end cap integrally fixed to one end. The end cap has a locking groove which receives the locking rib on the liner in a snap fit to lock the filter element, the safety sleeve assembly and the liner together. The other end of the pleated filter medium is generally received inside the end cap adjacent the gasket on the safety sleeve assembly. In addition, a conical outer liner is received around the pleated filter medium. The outer liner has a diameter at one end which is less than the diameter of the corresponding end of the pleated filter medium. This ensures that inward pressure will be exerted by the outer liner on the pleats of the filter medium to force the pleats into engagement with the inner liner and to space the pleats evenly around the periphery of the medium.

The pleated filter element, safety sleeve assembly, and the outer liner are meant to be sold in a replacement kit. The inner metal liner is to be retained and reused during subsequent air cleaning operations. The filter element is made in a collapsible form. Thus, the filter medium can take a substantially cylindrical form for shipping and have a substantially conical form when attached to the liner for use during the air filtering process. This decreases the shipping size of the replacement components of the filter element assembly to decrease the shipping costs of the filter element assembly of this invention.

BRIEF DESCRIPTION OF THE DRAWINGS

This invention will be described hereafter in the Detailed Description, when taken in conjunction with the following drawings, in which like reference numerals will denote like elements throughout the several views.

FIG. 1 is a side elevational view, partly in cross-section taken along the lines 1—1 of FIG. 2, of an improved air cleaner according to this invention, showing the filter element assembly of this invention installed in a filter body;

FIG. 2 is a bottom plan view of the assembled air cleaner of FIG. 1;

FIG. 3 is an exploded perspective view of the components of the filter element assembly shown in FIG. 1;

FIG. 4 is a partial cross-sectional view of the end of the safety sleeve assembly, as taken along the lines 4—4 of FIG. 3;

DETAILED DESCRIPTION

Figure 5:
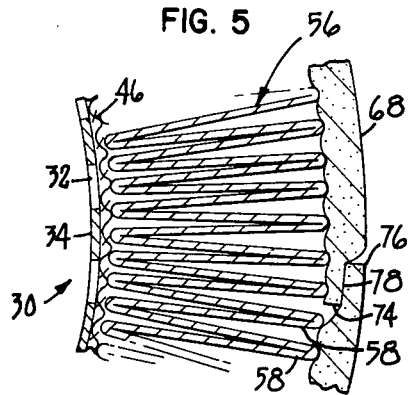
FIG. 5 is a cross-sectional view of the structure of a first embodiment of the filter element assembly according to this invention, as taken along lines 5—5 of FIG. 1.

Referring first to FIG. 1, an improved air cleaner according to this invention is generally indicated as 2. Air cleaner 2 is preferably meant for use with respect to an internal combustion engine (not shown) used as the power source for a movable vehicle. More particularly, air cleaner 2 as shown herein is of a type which is customarily used on over-the-road trucks and similar vehicles. However, the principles of this invention are not limited for use with regard to air cleaners on trucks or vehicles, but are generally applicable to any type air cleaner or filtering device regardless of the type of equipment on which the air cleaner 2 is used. In addition, this invention is also applicable to all gaseous filtering devices whether the gas being filtered comprises air or some other gas.

Air cleaner 2 comprises a metallic filter body 4 which is substantially cylindrical having an elongated interior filter chamber 6 therein. Filter body 4 has an air intake conduit 8 and an air outlet conduit 10. Filter body 4 is releasably or fixedly attached to the truck body (not shown) in any suitable manner. Intake conduit 8 is placed in fluidic communication with a source of ambient air and outlet conduit 10 is suitably attached to the air intake ports of all the cylinders in the internal combustion engine (not shown) with which air cleaner 2 is associated.

The end 11 of filter body 4 opposite to the end which supports outlet conduit 10 has an outwardly extending and annular mounting flange or retaining ring 12 which extends around the entire periphery of the filter body 4. End 11 of filter body 4 is normally open but is adapted to be closed by a detachable closure or cover 14. Cover 14 has an annular shoulder or lip 16 which is generally opposed to retaining ring 12. An annular gasket 18 is interposed between the lip 16 and ring 12. A plurality of bolts 20, which are releasably tightened by a plurality of threaded nuts 22, couple the ring 12 and 16 together in a releasable manner to effect attachment of cover 14. When the nuts 22 are tightened on bolts 20, gasket 18 will be compressed to effect an air-tight seal between the filter body 4 and the detachable cover 14. Cover 14 is detachable so that a filter element assembly, which is generally indicated as 30, can be removed and replaced from filter chamber 6. In this regard, it is preferred that cover 14 be easily accessible for replacement of filter element assembly 30 without having to detach filter body 4 from the truck body.

Referring to FIGS. 1 and 3, an improved filter element assembly according to this invention is shown generally as 30. Filter element assembly 30 comprises four separate components. The first component comprises an elongated porous inner liner 32. Liner 32 includes a generally conically shaped hollow, metallic body having a plurality of perforations 34 evenly spaced over its entire length. One end of the liner 32 is provided with an integral U-shaped annular housing or cup 36. Cup 36 defines a chamber 38 which points or faces back along the axis of liner 32. The other end of liner 32 has a reduced diameter section or portion 40. Reduced diameter portion 40 is provided with an outwardly protruding annular locking rib 42. The purpose of locking rib 42 and annular cup 36 will be explained in more detail hereafter. Since liner 32 is made of metallic materials, it is substantially permanent or reusable. Although it is preferred that liner 32 be metallic, the liner could also be made of any other suitably durable and permanent materials (e.g., high-impact plastic) which would allow liner 32 to be reused.

The second component of filter element assembly 30 comprises an elongated generally conically shaped safety sleeve assembly 44. Safety sleeve assembly 44 comprises a lightweight and flexible safety filter 46 which is made of any suitably porous cloth or fabric type material. One preferred material comprises a felt type fabric made from rayon and polyester. Safety filter 46 is relatively thin and very porous to air. The largest diameter end 47 of the safety filter 46 is fixedly coupled to a foamed urethane gasket 48. Referring to FIG. 4, gasket 48 comprises a radially extending flange 50 and an axially extending flange 52. Axially extending flange 52 has a slot in which the large diameter end 47 of the safety filter 46 is suitably secured as by gluing or the like.

Referring to FIGS. 1 and 3, filter element assembly 30 further includes an elongated filter element 54. Filter element 54 comprises an expandable filter medium 56 having a plurality of longitudinal pleats 58 therein. Filter medium 56 can have the pleats 58 thereof collapsed until it takes on a generally cylindrical form (FIG. 3), or pleats 58 can be expanded until filter medium 56 has a generally conical shape substantially identical to the shape of liner 32 (FIG. 1). In the conical form, filter medium 56 has a small diameter end 59 and a large diameter end 60. Filter medium 56 has a hollow bore 61 running therethrough which is adapted to receive inner liner 32 in a manner to be described hereafter.

An end cap 62 of molded polyurethane is integrally attached, as by gluing, to the small diameter end 59 of the filter medium 56. To facilitate this attachment, end cap 62 is attached when the pleats 58 have been collapsed such that filter medium 56 is in its smallest possible size. End cap 62 has a hollow cylindrical bore 64 which is shaped to receive the reduced diameter portion 40 of liner 32. Bore 64 of cap 62 is aligned with bore 61 of filter medium 56. An annular locking groove 66 is located in bore 64 and receives the locking rib 42 on liner 32 in a snap-fit arrangement as described hereafter. Although locking rib 42 and locking groove 66 define a preferred means for detachably locking filter medium 56 to liner 32, any other suitable releasable locking means could be used.

Filter medium 56 may comprise any material which is porous to air or to the other gas to be filtered but which is non-porous to the particulate matter suspended in the air. Common materials for filter medium 56 are paper and similar types of material which may also be chemically treated to enhance the filtering properties of medium 56.

In addition, filter element assembly 30 comprises a hollow outer wrap or liner 68 which also has a generally conical form. One end 70 of outer liner 68 has a diameter 71 which is generally equal to the small diameter end 59 of the pleated filter medium 56. The other end 72 of outer liner 68 has a somewhat larger diameter 73 for a purpose to be described hereafter. Outer liner 68 is preferably made of a foamed urethane material. This material is open celled and thus quite porous to air and other gases, and is also resilient.

Figure 6:
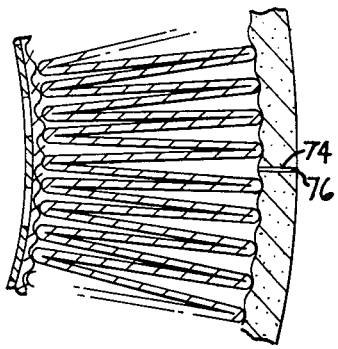
FIG. 6 is a cross-sectional view of the structure of a second embodiment of the filter element assembly according to this invention, taken along lines generally similar to those of 5—5 of FIG. 1.

One preferred method of forming outer liner 68 is to form the urethane material into a flat sheet, roll the sheet into the required cone shape, and then secure the sides 74 and 76 of the sheet together. The sides 74 and 76 of liner 68 are secured together generally as shown in the two embodiments of FIGS. 5 and 6. As shown in FIG. 5, the sides 74 and 76 of the outer liner 68 may each have a section 78 of reduced thickness. Sections 78 are overlapped and heat sealed together in a generally conventional manner. Alternatively, the sides 74 and 76 of outer liner 68 may also be simply abutted against one another as shown in FIG. 6. These abutting sides 74 and 76 are then heat sealed together. Although heat sealing is preferred in attaching the sides 74 and 76 together, any other suitable attachment means could be used.

Figure 7:
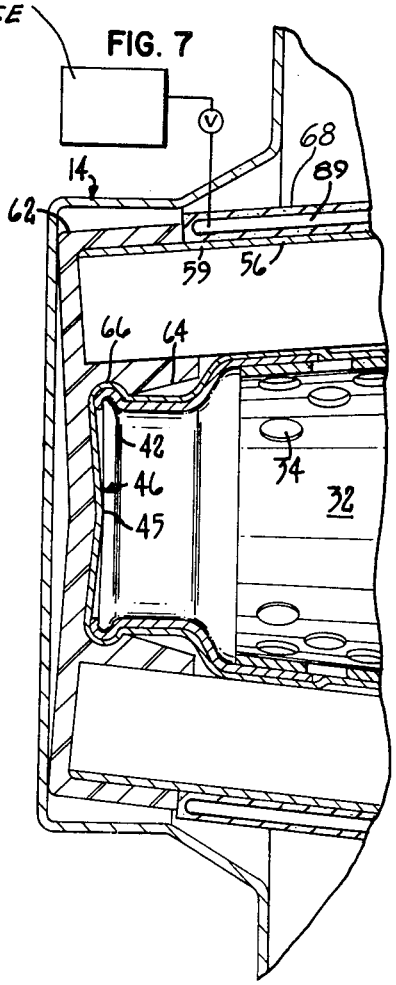
FIG. 7 is a partial cross-sectional view of the bottom of the filter element assembly according to this invention as installed in a filter body in an air cleaner.

Having described the various components of filter element assembly 30, the method of assembling and using filter element assembly 30 is unique when compared to that of prior art assemblies. More particularly, referring to FIG. 3, each filter element assembly 30 is assembled from the basic components shown therein. A preferred method of assembling these components is as follows. Safety sleeve assembly 44 is first slipped over the exterior surface of the inner liner 32 with the safety filter 46 covering the entire length of the liner 32 and the gasket 48 having its annular flange 50 received inside the chamber 38 of end cup 36. Safety filter 46 is long enough to cover the entire length of liner 32 and may have its free end 45 (i.e., the end opposite to gasket 48) formed in either an open or closed manner. FIG. 1 illustrates an open configuration for end 45 while FIG. 7 illustrates a closed configuration. In any event, the end 45 of the safety filter is generally tucked into the inside of the inner liner 32 as shown in FIGS. 1 and 3.

After placing the safety filter 46 onto the inner metal liner 32, the operator then places the outer liner 68 around the pleated filter medium 56 when medium 56 is still in a collapsed form. More particularly, the outer liner 68 is placed around filter medium 56 with the smallest diameter end 70 thereof being received generally around the smallest diameter end 59 of medium 56 and abutting against the end cap 62. Because the other end 72 of the outer liner 68 has a diameter 73 which is larger than the collapsed diameter of the other end 60 of the pleated medium 56, there will be some space provided between the outer liner 68 and filter medium 56 at this end. This ensures that liner 68 can be quickly and easily slipped around filter medium 56.

After outer liner 68 is placed around filter medium 56, the inner metal liner 32 with the attached safety sleeve assembly 44 is pushed down inwardly through the bore 61 of the pleated filter medium 56. Because of the tapered conical shape of the inner metal liner 32, as liner 32 is moved downwardly through the filter medium 56, the pleats 58 will be expanded until filter medium 56 assumes its conical form corresponding to the shape of liner 32. Inner liner 32 is moved downwardly through the pleated filter medium 56 until locking rib 42 engages the interior annular locking groove 66 on the end cap 62 in a snap fit. When this occurs, the upper large diameter end 60 of the pleated filter medium 56 will be fully expanded and will be received inside the chamber 38 of end cup 36 generally adjacent the sealing flange 50 of gasket 48. Gasket flange 50 seals the upper end 60 of filter medium 56 in a substantially air tight manner relative to end cup 36. This prevents air leaks around end 60 if any of the adjacent portions of pleats 58 should become damaged. In addition, the outer liner 68 will also have its upper end abutting against the end of the end cup 36 as shown in FIG. 1 at 79.

When the pleated filter medium 56 is fully expanded, its large diameter end 59 will have the outer diameter of approximately 8.5 inches. However, the largest diameter 73 of the outer large diameter end 72 of liner 68 is smaller (e.g., 7 inches). Thus, the outer liner 68 will be placed in tension which results in a radially inward force on each of the pleats 58. This radially inward force causes the pleats 58 to firmly engage the inner liner 32. In addition, the inward force tends to ensure that all the pleats 58 will be evenly spaced around the periphery of the pleated filter medium 56, and also serves to dampen any movement of the pleats 58 which might occur through vibration or fluctuations in the air pressure on pleats 58.

When all the components of filter element assembly 30 have been assembled in the above-noted manner, this assembly 30 can then be easily installed into filter chamber 6 of filter body 4. In this regard, detachable cover 14 is removed by uncoupling the nuts 22 from the bolts 20 and by lifting cover 14 off filter body 4. With the end cover 14 removed, the largest diameter end of the filter element assembly 30 is first inserted into filter chamber 6. Cover 14 is then replaced and recoupled to the filter body 4. When the nuts 22 are tightened, the cover 14 will engage the end cap 62 on the pleated filter medium 56 to force the entire assembly 30 upwardly into filter chamber 6. The exterior surface of the cup 36 on the metal liner 32 has an annular outwardly extending sealing gasket 80 which engages the end wall of the filter body 4 when cover 14 is replaced to form an air-tight seal therewith. Thus, air will flow into air cleaner 2 through the air intake conduit 8, through the porous outer liner 68, the filter medium 56, the safety sleeve assembly 44, the perforated inner metal liner 32, and then finally outwardly through the air outlet conduit 10. Conduit 10 is aligned with the bore 61 of filter medium 56 and the interior of liner 32 as shown in FIG. 1. During the passage of air in the above-noted manner, all or substantially all of the particular matter contained in the air will be absorbed by the filter medium 56, at least for particulate matter above a certain minimum predetermined size.

The air cleaner 2 which incorporates the improved filter element assembly 30 according to this invention has a number of advantages. A complete air cleaner 2 will usually be sold and installed on an existing truck or other movable vehicle with the filter body 4 being generally fixedly mounted on the vehicle. This initial purchase of air cleaner 2 will include a completed and assembled filter element assembly 30 located in filter chamber 6. As the vehicle on which air cleaner 2 is installed is driven, filter element assembly 30 filters the combustion air entering the internal combustion engine of the truck.

Figure 8:
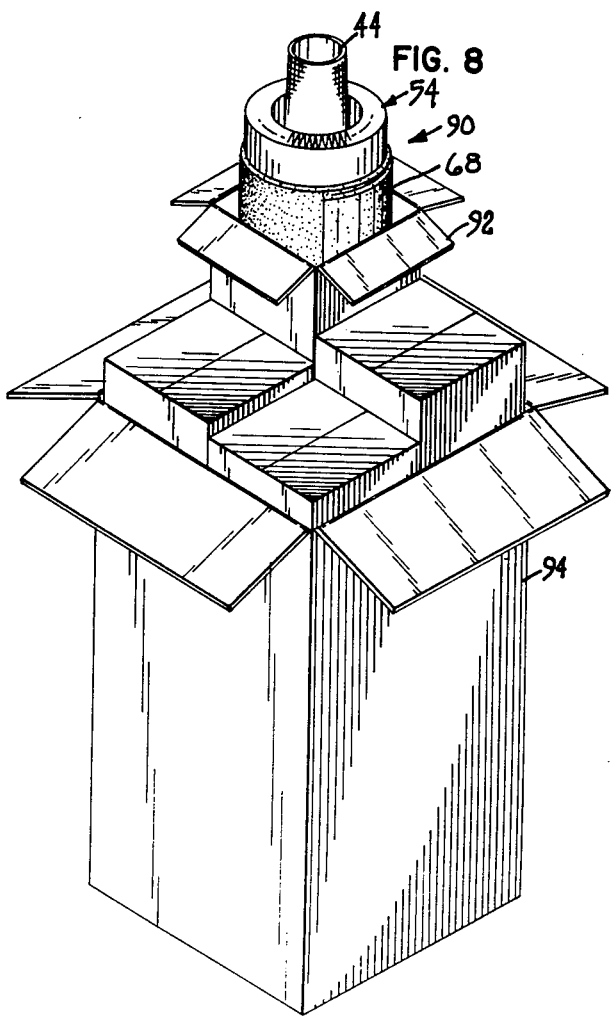
FIG. 8 is a perspective view of a plurality of replacement kits for the filter element assemblies according to this invention, showing four such kits in a shipping container with one of the kits being opened to illustrate the components thereof.

After the vehicle is operated a sufficient time such that the filter medium 56 becomes plugged and no longer is capable of properly filtering additional air, then the filter element assembly 30 is rejuvenated or reconditioned by removing the detachable cover 14 and disassembling the components 32, 44, 54 and 68 of the assembly. In this regard, the user of the air cleaner 2 will then purchase or have purchased a replacement kit, generally indicated as 90, of the replaceable or so-called "soft" components of the filter element assembly 30. Replacement kit 90 will include all of the components of the original filter element assembly 30 except for the inner metal liner 32 which can be reused. Thus, replacement kit 90 includes a new filter element 54, a new safety sleeve assembly 44, and a new outer liner 68, packaged generally as shown in FIG. 8 in a shipping container 92. After having disassembled the components of the used filter element assembly 30, the used soft components, 44, 54, and 68 thereof can then be discarded and replaced with the corresponding components of the filter element assembly replacement kit 90. Generally, the method of reassembling the filter element assembly 30 with the new soft components of replacement kit 90 will be identical to the assembling procedure described above. In other words, the safety sleeve assembly 44 is first positioned over the reusable metal liner 32, the outer liner 68 is then positioned over the pleated filter medium 56, and, finally, the inner metal liner 32 with the attached safety sleeve assembly 44 is pushed down through bore 61 of filter medium 56 until the end cap 62 locks with the locking rib 42 on liner 32.

Filter element assembly 30 according to this invention is substantially less expensive (i.e., up to 50% less expensive) than that of the prior art assemblies in which all the components thereof, including the metal liners, are discarded and replaced when the filter medium becomes plugged. This decrease in cost occurs because metal liner 32 is reused for successive cycles of filtering operations, thereby eliminating one of the more expensive components in prior filter element assemblies. Because filter element assembly 30 is less expensive, the costs of operating and maintaining any vehicles using such filter element assemblies can be reduced. This is especially true since the structure of filter element assembly 30 allows easy inspection of filter medium 56. For example, the assembly 30 can be easily disassembled and the filter medium 56 checked for wear before assembly 30 is reconditioned with replacement kit 90. Such reconditioning can therefof be done only when filter medium 56 is fully plugged and beyond continued effective use. This eliminates the waste of the prior practice of discarding and replacing filter element assemblies according to a mileage schedule rather than the actual condition of the filter medium.

In addition, the particular type of filter element 54 used in assembly 30 has a number of advantages. Because the pleated filter medium 56 can assume a substantially cylindrical form for shipping, but yet can be expanded into a conical form during use in the air cleaner 2, the size of the shipping containers 92 for the replacement kits 90 can be greatly decreased. Generally, four replacement kits 90 can now be shipped in a single shipping carton 94 of the size which would have been suitable for shipping only a single prior art filter element assembly in which the filter medium could not be collapsed. Obviously, a great savings in both the shipping and storage costs of replacement kits 90 can now be effected with the filter element 54 of this invention. In addition, because each replacement kit 90 need no longer have a metal liner 32 therein, this kit is thus lighter which also contributes to a decrease in shipping costs. This decrease further increases the advantages and utility of the filter element assembly 30 of this invention.

Although it is preferred that filter medium 56 be expandable, this is not strictly necessary to the other aspects of this invention (i.e., the concept of using a permanent metal liner 32 and reconditioning the assembly 30 with the soft components 44, 54, and 68.) Instead, the pleated filter medium 56 could be provided only having a conical form. However, this configuration would increase the size, and thus the shipping costs of the replacement kits 90.

An added advantage of the improved filter element assembly of the present invention is that the outer liner 68, which is preferably made from an open celled material such as foamed urethane, acts as a precleaner. The outer wrap or liner 68 filters some unwanted material, primarily the larger particles, from the air flowing through the assembly, thereby extending the life of the pleated filter element.

While the preferred embodiment of filter element assembly 30 comprises four inter-related elements, i.e. inner liner 32, safety sleeve assembly 44, filter element 54, and outer liner 68, this is only a preferred embodiment of the invention. Obviously, the invention has a number of novel features which could be used in part by incorporating less than all four of the components of the preferred embodiment. For example, safety sleeve assembly 44 is preferred since it serves to protect the inner edges of the pleats 58 of filter medium 56 from rubbing against metal liner 32. Thus, the safety sleeve assembly 44 prevents holes from being rubbed in the inner edges of pleats 58 and also serves via gasket 48 for sealing the upper edge of the filter medium. While the preferred embodiment of the invention incorporates safety sleeve assembly 44, it would nonetheless be possible to delete safety sleeve assembly 44 from the filter element assembly 30 keeping in mind that the various advantages yielded by this component would no longer be present. The same is also true for the presence of outer liner 68. Outer liner 68 is preferred since it serves as a means for radially biasing the pleats 58 into engagement with the inner liner 32. However, it would be possible to delete outer liner 68 from the filter element assembly 30, keeping in mind that the inward biasing force yielding by this component would no longer be present.

Various other modifications of this invention will be apparent to those skilled in the art. For example, outer liner 68 is effective to provide the inward biasing force on the pleats because of its resilient construction and the shape of outer liner 68 relative to the filter element 54. However, outer liner 68 could also be provided with some other type of means for providing the inward biasing force. For example, outer liner 68 could be constructed with a double wall construction defining a chamber into which compressed air (or other fluid under medium pressure) could be conducted to cause the innermost wall of the liner to press inwardly on the pleats of the filter medium. For example, a chamber 89 in the interior of outer liner 68 could be connected to a fluid pressure source through a valve V as illustrated in FIG. 7. Or, the outer liner might include springs 96 for exerting the biasing force. Accordingly, the scope of this invention is to be limited only by the appended claims.

I claim:

1. An improved filter element assembly for use in an air cleaning device having a filter body which defines a filter chamber, said filter element assembly being releasably contained in said filter body, wherein said filter element assembly comprises:

(a) an elongated perforated liner assembly, said liner assembly being made from a material which is sufficiently durable to enable said liner assembly to be reused during successive air cleaning operations over the life of the air cleaning device;

(b) a disposable and elongated filter element which includes a filter medium having a plurality of pleats, said filter medium being made from a material which is substantially porous to air and substantially nonporous to predetermined particulate matter suspended in the air, whereby said filter medium removes the particulate matter from the air;

(c) locking means for releasably coupling said filter element to said liner assembly with said filter medium surrounding said liner assembly in a face-to-face relationship, whereby said filter element may be detached from said liner assembly when said filter medium becomes plugged with the particulate matter to allow said liner assembly to be reused; and (d) an elongated porous outer liner surrounding and engaging said filter medium, wherein said outer liner has means for applying a radially inward force to said filter medium to press said pleats into engagement with said liner assembly.

2. An improved filter element assembly for use in an air cleaning device having a filter body, wherein said filter element assembly comprises:

(a) an elongated and perforated liner having a locking rib at one end thereof and an annular cup at the other end thereof;

(b) a filter element releasably coupled to and surrounding said perforated liner in a concentric manner, said filter element having an interior bore and comprising a filter medium having opposed first and second ends, said first end of said filter medium being received in said end cup on said perforated liner and said second end of said filter medium having an end cap attached thereto, said end cap having an annular locking groove which receives said locking rib when said perforated liner is inserted into the bore of said filter element;

(c) a safety sleeve assembly which comprises a porous safety filter having a gasket attached to one end, said safety filter being positioned between said filter element and said perforated liner with said gasket being received between said first end of said filter medium and said end cup to seal said first end therein; and (d) wherein said locking rib is configured relative to said annular locking groove to form a snap fit, whereby said filter element, said perforated liner, and said safety sleeve assembly may be releasably interlocked into a completed filter element assembly.

3. An improved filter element assembly for use in an air cleaning device, which comprises:

(a) a perforated inner liner having a locking rib at one end thereof;

(b) a filter element which comprises:

(i) an elongated hollow filter medium located around said inner liner and comprising a plurality of pleats which extend longitudinally along an axis of said filter medium, said pleats enabling said filter medium to be expanded and contracted between a first and second configuration, said filter medium further being made of a material which is substantially porous to air and nonporous to predetermined particulate matter suspended in the air; and (ii) an end cap fixedly attached to one end of said filter medium, said end cap having an interior bore provided with a locking groove for receiving said locking rib on said liner to couple said filter element to said liner, said filter element when assembled to said liner having said pleats thereof expanded into said second configuration to substantially simulate an interior configuration of said liner; and (c) a porous outer liner which encircles and engages the filter element, wherein said outer liner has means for applying a radially inward force on said pleats.

4. An air cleaning device for removing predetermined particulate matter suspended from air, which comprises:

(a) a filter body having an air intake and an air outlet, said filter body having an open end for providing access to an interior filter chamber;

(b) a detachable cover for closing said open end in said filter body, said cover being removable from said filter body to give access to said filter chamber;

(c) a filter element assembly contained in said filter chamber whereby air passes through said air intake, through said filter element assembly and out through said air outlet with the particulate matter in said air being filtered by said filter element assembly, said filter element assembly comprising:

(i) an elongated perforated liner assembly, said liner assembly being made from a material which is sufficiently durable to enable said liner assembly to be reused during successive air cleaning operations over the life of the air cleaning device;

(ii) a disposable and elongated filter element which includes a filter medium having a plurality of pleats, said filter medium being made from a material which is substantially porous to air and substantially nonporous to predetermined particulate matter suspended in the air, whereby said filter medium removes the particulate matter from the air;

(iii) locking means for releasably coupling said filter element to said liner assembly with said filter medium surrounding said liner assembly in a face-to-face relationship, whereby said filter element may be detached from said liner assembly when said filter medium becomes plugged with the particulate matter to allow said liner assembly to be reused; and (iv) a porous and elongated outer liner surrounding and engaging said filter medium, wherein said outer liner has means for applying a radially inward force to said filter medium to press said pleats into engagement with said liner assembly.

* * * * *